(12) United States Patent
Brillon

(10) Patent No.: US 7,119,660 B2
(45) Date of Patent: *Oct. 10, 2006

(54) PROCESS FOR CONTROLLING THE ANTENNAS OF A HANDS-FREE SYSTEM OF AN AUTOMOTIVE VEHICLE AND CORRESPONDING DEVICE

(75) Inventor: Alain Brillon, Villeneuve Tolosane (FR)

(73) Assignee: Siemens VDO Automotive, Toulouse Cedex 1 (FR)

( * ) Notice: Subject to any disclaimer, the term of this patent is extended or adjusted under 35 U.S.C. 154(b) by 331 days.

This patent is subject to a terminal disclaimer.

(21) Appl. No.: 10/713,203

(22) Filed: Nov. 17, 2003

(65) Prior Publication Data
US 2004/0174245 A1  Sep. 9, 2004

(30) Foreign Application Priority Data
Aug. 5, 2002  (FR) ................................... 02 09916

(51) Int. Cl.
G05B 19/00  (2006.01)
G08C 19/00  (2006.01)

(52) U.S. Cl. .................. 340/5.61; 455/41.2; 455/63.1; 340/825.72

(58) Field of Classification Search ............... 340/5.61, 340/5.72, 825.72, 825.69, 425.5, 539.1, 572.1; 455/129, 63.1, 41.2, 345, 272
See application file for complete search history.

(56) References Cited

U.S. PATENT DOCUMENTS

| | | | |
|---|---|---|---|
| 6,100,603 A | * | 8/2000 | Gold .......................... 307/10.2 |
| 6,828,900 B1 | * | 12/2004 | Brillon ....................... 340/5.61 |
| 2001/0003405 A1 | | 6/2001 | Morillon |
| 2002/0154002 A1 | | 10/2002 | Brillon |

FOREIGN PATENT DOCUMENTS

| | | |
|---|---|---|
| EP | 0 426 114 | 5/1991 |
| FR | 2 826 732 | 1/2003 |

* cited by examiner

*Primary Examiner*—Wendy R. Garber
*Assistant Examiner*—William Bangachon
(74) *Attorney, Agent, or Firm*—Young & Thompson

(57) ABSTRACT

In this process for controlling at least two groups of antennas, a coded signal (26) is emitted by a first group of antennas, whilst the antennas of a second group emit a residual signal (28) similar to the coded signal but of lesser amplitude.

The coding used in this case is such that the coded signal (26) has dead time.

A parasitic signal (34) is sent to the second group of antennas (6) during dead time of the coded signal (26) sent to the first group of antennas.

14 Claims, 1 Drawing Sheet

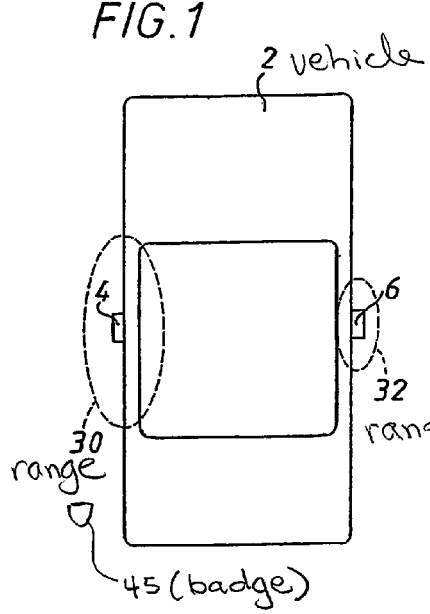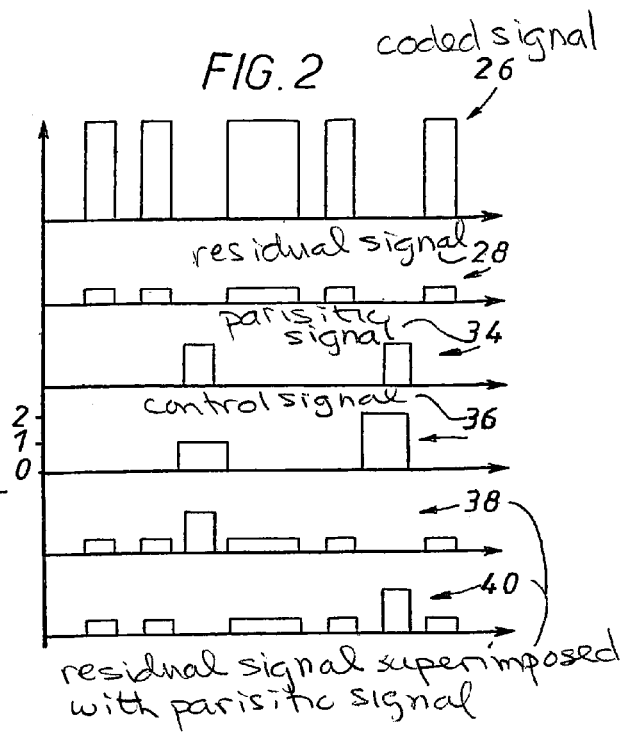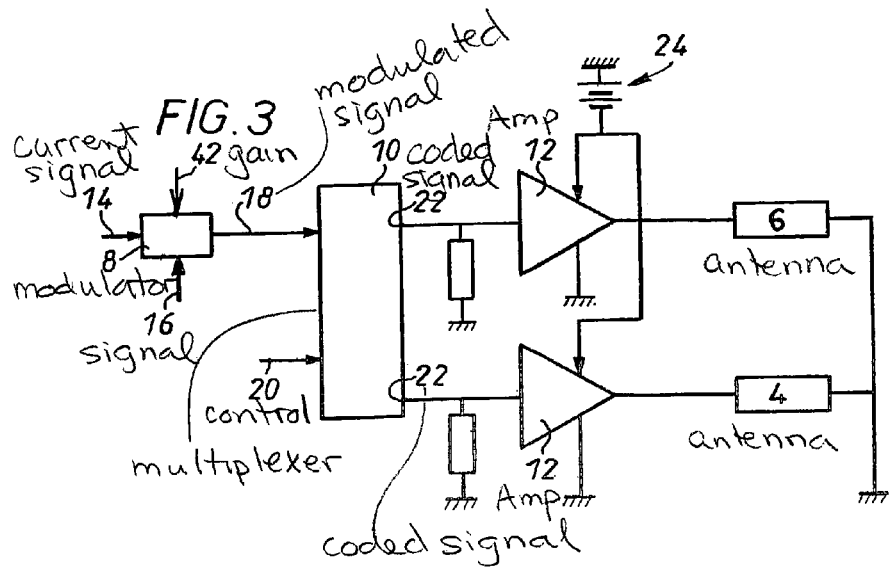

PROCESS FOR CONTROLLING THE ANTENNAS OF A HANDS-FREE SYSTEM OF AN AUTOMOTIVE VEHICLE AND CORRESPONDING DEVICE

The present invention relates to a process for controlling the antennas of a hands-free system of an automotive vehicle.

A hands-free system permits having access to one's vehicle and starting the latter without having to use a mechanical key. The user of the vehicle is thus simply provided with an electronic card (also called in what follows a badge) which is detected and recognized by a control and management device associated with antennas disposed onboard the vehicle. If the card is identified by the control and management device as being an authorized card of the vehicle, the bearer of this card can enter the interior of the vehicle simply by grasping a door handle and then, according to certain configurations, start the motor of the vehicle by simple action on a button.

Generally, for such a hands-free system, a group of antennas is adapted to detect the presence of the badge outside the vehicle and another within the latter. If an authorized badge is detected outside the vehicle, the control and management system will permit access to the vehicle without however permitting starting it, whilst if this badge is within the vehicle, starting of the motor can take place. In certain hands-free systems, it is also provided to detect whether the badge is located on the driver's side of the vehicle or else on the passenger's side.

To effect the location of the badge, a signal is sent to a group of antennas (which can be a single antenna) which thus carry out a corresponding emission whilst no signal is sent to the other antennas, such that these latter remain silent. The antennas used are LF (low frequency) antennas of short range, thereby permitting carrying out good location of the corresponding badge.

The control and management device integrates electronics comprising particularly amplifier circuits to send high power signals to the antennas. This electronic control of the antennas does not permit sending a high power signal at low cost to a group of antennas, without sending a weak signal corresponding to the antennas adapted to remain silent. This is due to a problem of diaphony, known to those skilled in the art, between the different amplifier circuits.

This problem of diaphony can lead to errors of location of the badge of the vehicle in a free-hands system of an automotive vehicle. Thus for example, when the interior antennas emit the high power signal in the direction of the badge to detect it, the external antennas also emit a signal, which although of low power, can be detected by the badge. If the badge is thus located immediately adjacent an external antenna, it will be identified and located as being within the vehicle. In the case in which the driver it outside the vehicle, with the badge in his rear pocket of his trousers against the door handle which generally includes the antenna, the badge would be considered as being within the vehicle and during an attempt to start, for example by a child playing within the vehicle, the motor will be actuated.

The solution of the prior art to solve these problems of diaphony is the total disconnection of the antenna that is to remain silent, from the rest of the circuit with the help for example of a relay. This solution is effective but of high cost.

The present invention thus has for its object to provide a low cost solution to the problem of diaphony described above.

To this end, it provides a control process for at least two groups of antennas, according to which a coded signal is emitted by a first group of antennas whilst the antennas of the second group emit a residual signal similar to the coded signal but of lesser amplitude, the coding used being such that the coded signal has dead time.

According to the invention, a parasitic signal is sent to the second group of antennas during the dead time of the coded signal sent to the first group of antennas. In this way, the signal sent to the second group of antennas is the superposition of a residual signal and a parasitic signal. This modification of the residual signal renders this signal incomprehensible for the badge that receives it. For the hands-free system, everything thus happens as if the antennas of the second group of antennas were perfectly silent.

So as best to avoid the antennas which must preferably remain silent, and to limit energy consumption, the amplitude of the parasitic signal corresponds preferably substantially to the amplitude of the residual signal. To this end, a gain control device limiting the power of the emitted parasitic signal can be provided.

The process according to the invention is suitable for example to the case in which the signal emitted by the first group of antennas is a coded signal with amplitude modification.

In a control process according to the invention, sending of the parasitic signal to the antennas of the second group of antennas is carried out for example by an analogic multiplexer which selects the second group of antennas during a dead time of the coded signal destined for the first group of antennas.

The present invention also relates to a control device comprising means to send alternatively a coded signal to several groups of antennas, the coding used being such that the coded signal has dead time, characterized in that means are provided to send a parasitic signal to a second group of antennas when a coded signal is sent to a first group of antennas, the parasitic signal being sent to the antennas of the second group during a dead time of the signal sent to the first group of antennas.

Such a device permits the practice of the control process according to the invention. It comprises preferably an analogic multiplexer which selects the group of antennas to which a signal is sent.

Preferably, the control device according to the invention moreover comprises a gain control device limiting the power of the parasitic signals emitted. It can moreover comprise at least one linear amplifier per group of antennas, to amplify the coded signal before sending it to the corresponding antennas.

Finally, the present invention also relates to a system of hands-free access to a vehicle, comprising at least two groups of antennas, an electronic identification card, as well as control electronics, characterized in that it moreover comprises a control device as described above.

The description which follows relates to the operation, the characteristics and advantages of a preferred embodiment of the control device according to the invention, with the help of the accompanying schematic drawing, in which:

FIG. 1 shows schematically a vehicle and two antennas for detection of a badge,

FIG. 2 gathers the diagrams each showing a signal used for management of the antennas, and FIG. 3 shows schematically an electronic control circuit for the antennas of the vehicle of FIG. 1.

FIG. 1 shows very schematically an automotive vehicle 2, or vehicle 2, seen from above, provided with LF (low frequency) antennas. For the sake of simplification, only two antennas have been shown. One of these antennas is integrated into the front left door of the vehicle 2 and bears the reference numeral 4, whilst the other is integrated into the front right door and bears the reference 6. The antennas 4 and 6 are for example integrated into the external handles of the two front doors of the vehicle 2.

The antennas 4 and 6 are adapted to emit an amplitude modulated signal of predetermined power so as to permit having a range of the order of one meter.

The signal emitted by the antennas is adapted to be received by an electronic card also called a badge 45 in what follows. When this badge enters the field of emission of the antennas, it receives the modulated signal emitted by the antennas and thus emits in its turn a coded signal. This new signal is typically an RF (radio frequency) signal of a frequency of 433 MHz. It is received by an RF antenna provided for this purpose and analyzed to identify whether the code emitted by the badge corresponds to the code necessary to permit access to the vehicle 2 and possibly also starting its motor.

The present invention and the description which follows relate essentially to the signal emitted by the antennas 4 and 6 toward the badge.

The antennas 4 and 6 are used to dialog with the batch but also permit locating it. FIG. 3 shows schematically an antenna control device permitting locating a badge to determine reliably whether the latter is located to the left of the vehicle 2 (or driver's side) or to the right of this vehicle (passenger side). This device comprises a modulator 8, an analogic multiplexer 10 and two linear amplifiers 12.

The modulator 8 is supplied by a current carrier 14 as well as by a signal 16 to be modulated and provides a modulated signal 18 which is inserted in an input of the analogic multiplexer 10. This latter also comprises a second input by which it receives a signal 20 indicating to which antenna or antennas the modulated signal 18 is to be sent.

In the present case, the antennas are assembled in two groups of antennas, the right antennas 6 and left antennas 4. For simplification, there will be considered here the particular case in which a group of antennas is reduced to a single antenna. The multiplexer 10 thus comprises two outputs 22, one toward each of the antennas. The output signal of the multiplexer is amplified each time by an amplifier circuit which comprises a linear amplifier 12. The two amplifiers are supplied by a same voltage source 24. The signal amplified by each circuit is thus sent to the corresponding antennas to be emitted toward a badge.

A device as described above is already known to those skilled in the art and is already used for antenna control.

Let it be supposed in what follows that the signal 20 for antenna selection controls the sending of a signal only by the left antenna 4. With the device described above and known to the prior art, the signal supplying the left antenna 4 is for example of the shape shown in the first diagram of FIG. 2 by the curve 26. The amplitude of this signal is for example of the order of 20 V. Let it be supposed here that the signal emitted by an antenna has substantially the shape of the signal supplying it.

The described device has problems of diaphony set forth in the preamble and a non-zero modulated signal shown by the second diagram of FIG. 2 by the curve 28 thus supplies the right antenna 6. The amplitude of this modulated signal, which is a residual signal, is of the order of 100 mV.

FIG. 1 shows by the broken line 30 the range of the antenna 4 supplied by the signal shown by the curve 26. The range of the antenna 6 supplied by a parasitic signal (curve 28) is shown by a broken line 32. To give an order of magnitude, the range of this antenna 6 is of the order of 10 cm whilst for the antenna 4 this range outside the vehicle 2 is greater than one meter.

The present invention proposes superposing on the residual signal a parasitic signal such that the signal which is the combination of the residual signal and the parasitic signal cannot be interpreted by a badge. It will be noted from curve 26 that the signal supplying the antenna 4 is an amplitude modified signal, coded, which comprises dead time. Thus, this signal is a series of transmissions and absences of transmission of a carrier signal. It is here for example an LF (low frequency) signal of a frequency of the order of 125 kHz. The parasitic signal supplies the antenna 6, which should ideally remain silent, during a dead time, which is to say in the absence of carrier signal transmission.

FIG. 2 shows an embodiment of the invention in which three groups of antennas are provided. This can be the case in an automotive vehicle. There can be an external antenna to locate a badge located outside the vehicle on the driver side, antennas to detect a badge located outside the vehicle on the passenger side, and a group of antennas to detect the presence of a badge within the vehicle. These different groups of antennas bear the numerals 0, 1 and 2. The curve 34 in FIG. 2 shows the parasitic signal that it is desired to superpose on the residual signal emitted by the antennas which are to remain silent. The curve 36 in this FIG. 2 represents the signal 20 for selection of an antenna which enters the multiplexer 10. When this signal equals 0, the multiplexer 10 directs the modulated signal 18 leaving the modulator 8 toward the amplifier corresponding to the left antenna 4. Let it here be supposed that this antenna is to emit a signal corresponding to the curve 26 of FIG. 2. When the antenna selection signal 20 has the value 1, the multiplexer 10 sends the modulated signal 18 toward the amplifier 12 corresponding to the antenna 6. Finally, when the antenna selection signal 20 has the value 2, the modulated signal 18 is sent by the multiplexer 10 toward the amplifier corresponding to the internal antennas. In FIG. 3, for simplification, only two amplifiers are shown, but those skilled in the art will without difficulty be able to interpolate an identical diagram for three, four or even more, groups of antennas.

At the output of antenna 4, there is a signal which has the appearance of the signal shown in curve 26 of FIG. 2. The curves 38 and 40 correspond respectively to the appearance of the signal that it is desired to obtain at the output of the antenna 6 and the internal antennas. Each of these two signals is the superposition of the residual signal 28 and a portion of the parasitic signal 34. These signals cannot be interpreted by a badge located adjacent the right antenna 6 or an internal antenna. Thus only a badge located adjacent the left external antenna 4 could recognize the signal which it receives. Preferably, at the antenna output, the parasitic signal has an amplitude substantially identical to the amplitude of the residual signal. In this way, the parasitic signal will "disappear" into the residual signal and is demodulated like the latter. To thus limit the power of the emitted parasitic signal, the modulator 8 is preferably provided with a gain control device 42 shown in FIG. 3 by an arrow. Thus, when the signal 16 to be modulated corresponds to the signal to be emitted by the group of emitting antennas, the gain is at the maximum whilst when the signal 16 to be modulated corresponds to the parasitic signal, the gain takes a predetermined value permitting obtaining a parasitic signal at the antenna output which is to remain substantially silent, of the same order of magnitude as the residual signal due to problems of diaphony.

By limiting the power of the emitted parasitic signal, the power of the signal at the output of the antennas that are to remain silent is also limited. In this way, the energy controlled by the system is better employed and there is also avoided the disturbance of a region of large size about the antennas that are to remain silent. Thus, if these antennas that are to remain silent emit a powerful signal, the range of this signal would be great and any badge located thus in the region covered by the antennas that are to remain silent, would be actuated as if it had received a real request.

The solution proposed by the invention to solve the encountered problems of diaphony thus does not consist in improving the electronic performances to attenuate the residual signal to the antennas which it is desired to remain silent, but consists in emitting a parasitic signal to these antennas. This solution can be effected almost without increasing cost of the electronics, with excellent results, because the signal emitted by the silent antennas cannot be interpreted by the corresponding badges. As to these badges, the antennas are thus as though completely silent. Moreover, the parasitic signal which is interposed does not disturb normal emission of the antennas, particularly if the power of the parasitic signal is limited, for example with the help of a gain control system.

In the case set forth above in which the driver of the vehicle 2 has placed his badge in a rear pocket of his trousers and leans against the handle of a door including an external antenna, the badge will not be located by the hands-free system of the vehicle as being in the vehicle, because the signal received by the badge cannot be interpreted by this latter. Any attempt to start the motor will thus remain unfruitful.

The present invention is not limited to the embodiment described above by way of non-limiting example. It also relates to all the modifications within the scope of those skilled in the art, within the scope of the accompanying claims.

Thus, the invention is not limited to the control of antennas divided into two separate groups. It can also be applied to three (or more) groups of antennas when it is desired that one or several of these groups of antennas, under predetermined conditions, will remain silent.

For the purpose of clarity, the description given above envisages sending a parasitic signal only during dead time to each group of antennas that are to remain silent. It is possible to send parasitic signals during several dead times, or even during all the dead times.

The invention claimed is:

1. Process for controlling at least two groups of antennas (4, 6), comprising:
    sending a coded signal to a first group of antennas (4) and to a second group of antennas (6);
    emitting the coded signal (26) from the first group of antennas (4) whilst a second group of antennas (6) emit a residual signal (28) similar to the coded signal but of lesser amplitude, the coding used being such that the coded signal has dead time; and
    sending a parasitic signal (34) to the second group of antennas (6) during the dead time of the coded signal, wherein the residual signal is based on the coded signal and the parasitic signal.

2. Control process according to claim 1, wherein an amplitude of the parasitic signal corresponds substantially to an amplitude of the residual signal.

3. Control process according to claim 2, comprising the further step of using a gain control device (42) to limit a power of the emitted parasitic signal.

4. Control process according to claim 1, wherein the coded signal emitted by the first group of antennas (4) is an amplitude modulated coded signal.

5. Control process according to claim 1, further comprising the step of sending the parasitic signal to the antennas of the second group of antennas (6) by using an analogic multiplexer (10) which selects the second group of antennas (6) during the dead time of the coded signal.

6. Control device, comprising:
    means (10) to send alternatively a coded signal to several groups of antennas, the coding used being such that the coded signal has dead time, wherein,
    said means sends a parasitic signal to a second group of antennas (6) when a coded signal is sent to a first group of antennas (4), the parasitic signal being sent to the antennas of the second group during the dead time of the coded signal.

7. Control device according to claim 6, wherein said means comprises an analogic multiplexer (10) that selects the group of antennas to which a signal is sent.

8. Control device according to claim 6, wherein said means comprises a gain control device (42) that limits the power of the emitted parasitic signals.

9. Control device according to claim 6, wherein said means further comprises at least one linear amplifier (12) per group of antennas to amplify the coded signal before sending the coded signal to the corresponding antennas.

10. System for hands-free access to a vehicle, comprising at least two groups of antennas (4, 6), an electronic identification card as well as control electronics, and the control device according to claim 6.

11. A system for hands-free access to a vehicle, comprising:
    a first antenna (4);
    a second antenna (6); and
    a code transmitter configured to transmit radio frequency amplitude modulated coded signals of predetermined power to the first antenna and to the second antenna, the code transmitter comprising a multiplexer (10) connected to input a coded signal (18) and having a coded signal output (22) for sending the coded signals to the first and second antennas, wherein,
    a first coded signal is sent from the coded signal output to the first antenna, the first coded signal comprising dead time within amplitude modulated code signals, and
    a second coded signal is sent from the coded signal output to the second antenna, the second coded signal comprising a residual signal of the first coded signal superimposed, during the dead time, with a parasitic signal such that the second coded signal is a combination of the residual signal and the parasitic signal, the parasitic signal appearing during the dead time of the first coded signal.

12. The system of claim 11, wherein,
    the multiplexer is an analogic multiplexer and further comprises a control signal input (20) for indicating to which of the first and second antennas the coded signals are to be sent, and
    a control signal received at the control signal input (20) determines when the residual signal is superimposed with the parasitic signal.

13. The system of claim 12, wherein,
    a first control signal value causes the multiplexer to direct the coded signal (26) leaving the coded signal output to be directed toward the first antenna (4), and
    a second control signal value causes the multiplexer to direct the coded signal (38) leaving the coded signal output to be directed toward the second antenna.

14. The system of claim 13, further comprising a badge (45) configured for communicating with the first antenna and the second antenna.

* * * * *